United States Patent [19]
Schultz

[11] 3,819,840
[45] June 25, 1974

[54] CONTROL SYSTEM FOR TORCH CURRENT IN A PLASMA ARC FURNACE

[75] Inventor: Ronald G. Schultz, Bay Village, Ohio

[73] Assignee: United States Steel Corporation, Pittsburgh, Pa.

[22] Filed: May 18, 1972

[21] Appl. No.: 254,586

[52] U.S. Cl. .................................... 13/1, 219/121 P
[51] Int. Cl. ............................................. H05b 7/00
[58] Field of Search ............ 219/121 P; 13/1, 1 Z, 9

[56] References Cited
UNITED STATES PATENTS
3,546,347  12/1970  Hausig ........................ 219/121 P X
3,588,441  6/1971   Dobbs ............................ 219/121 P Primary Examiner—Roy N. Envall, Jr.
Attorney, Agent, or Firm—Rea C. Helm

[57] ABSTRACT

A control system for the torch current of a plasma arc torch has a thermal converter providing a signal representative of the torch current. A function generator, based on the ionizing gas used, alters the signal to provide an inverse torch current characteristic signal which is compared to a desired inverse torch characteristic signal and the resultant error used to control gas flow to the torch. When gas pressure becomes too high or too low, a controller alters a reactance in the series with the primary winding of the power supply transformer to change the electrode voltage.

4 Claims, 1 Drawing Figure

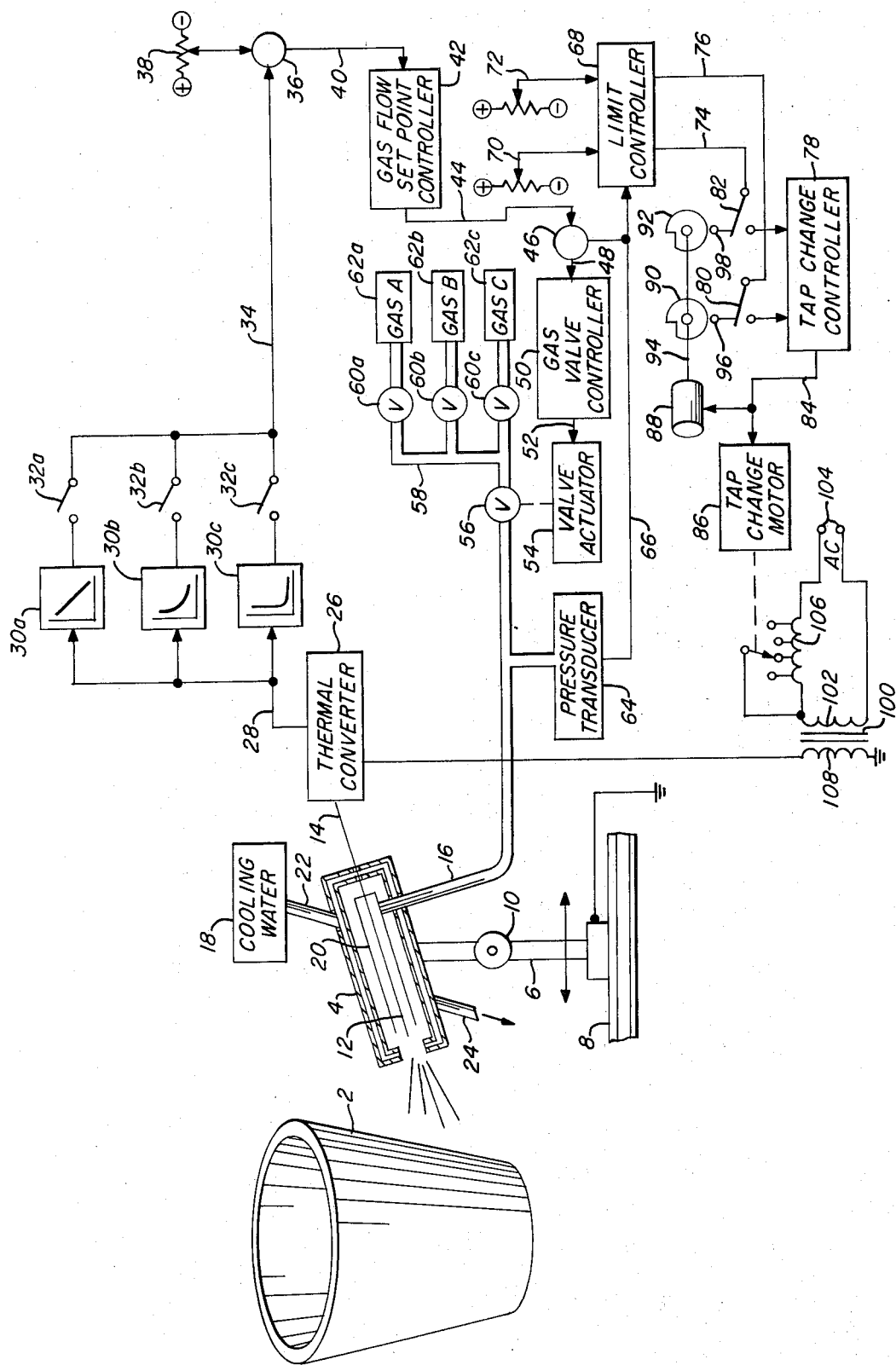

CONTROL SYSTEM FOR TORCH CURRENT IN A PLASMA ARC FURNACE

This invention relates to a system for controlling the plasma arc torch current in a plasma arc furnace and more particularly, to a system for automatically controlling a plasma arc torch current by controlling the gas flow to the torch and the electrode voltage of the torch.

Plasma arc furnaces are used to obtain a high heating rate such as may be required in the melting of a steel ingot. Temperature of the arc is dependent upon the type of ionizing gas used, the gas flow rate, the voltage drop across the arc, the material being heated and the current to the torch. The proper interaction of these factors mostly in a non-linear fashion along with torch design and furnace configuration produces the desired heating rate. Control of arc current is of primary importance to successful operation of a plasma arc furnace. If current level rises excessively, the cathode within the torch is eroded and finally is damaged to a degree requiring replacement. At very low currents the energy input can be decreased so much that it becomes too difficult to establish and maintain an arc. If the arc temperature tends to decrease, the heating rate of the material tends to decrease.

It is therefore an object of my invention to provide a control system for a plasma arc torch current by changing the gas flow rate.

Another object is to provide a control system for controlling plasma arc torch current by changing the voltage across the plasma arc torch.

Still another object is to provide a control system that controls the rate at which the plasma arc torch current changes.

A still further object is to provide a control system that controls the limits of the plasma arc torch current.

These and other objects will become more apparent after referring to the following specification and drawing in which the single FIGURE is a schematic view of my invention.

Referring now to the drawing, reference numeral 2 indicates a furnace, as for example, for remelting a steel ingot. A plasma arc torch 4 heats furnace 2. Torch 4 has a tiltable mount 6 which moves along a track 8 to move torch 4 towards and away from furnace 2. Further torch adjustment includes a pivot 10 to provide vertical adjustment. Torch 4 has an electrode 12 connected to a power cable 14. An ionizing gas is introduced through a line 16. Cooling water from a source 18 enters a cooling jacket 20 through a line 22 and exits through a discharge line 24. The parts thus far described relate to a conventional plasma arc torch used to heat a furnace although there may be more than a single torch surrounding furnace 2 and there may be more than a single jet of gas within torch 4.

A thermal converter 26 provides an output signal 28 which is proportional to the magnitude of the arc torch current entering the torch 4 through cable 14. Converter 26 may be such as manufactured by Leeds & Northrup Co., Rockland and Stenton Avenues, Philadelphia, Pa. Signal 28 is connected to three function generators 30A, 30B and 30C connected in parallel. The function generators may be such as those manufactured by Electronic Associates, Inc., 185 Monmouth Park Highway, West Long Beach, New Jersey. The outputs of the function generators are connected in parallel through switches 32A, 32B and 32C, respectively, to an output line 34. Output 34 is connected to a set point 36, such as a summing amplifier, which has connected to it a desired torch current set potentiometer 38 and an output line 40. Output 40 is connected to the input of a gas flow set point controller 42 which may be a Series 52EK2000 manufactured by Fischer and Porter Co., 51 Warminster Road, Warminster, Pa. Output 44 of controller 42 is connected to a gas flow set point 46, such as a summing amplifier, having an output 48 connected to a gas valve controller 50 which may be the same type as controller 42. An output 52 of controller 50 is connected to a valve actuator 54 which actuates a gas valve 56. Valve 56 may be an equal percentage valve as manufactured by Leslie Company, Cleveland Avenue, Lyndhurst, New Jersey. Valve 56 connects gas line 16 with a gas manifold 58 having three valves 60A, 60B and 60C connecting the manifold to three gas sources 62A, 62B and 62C, respectively, of three different gases. A pressure transducer 64 is connected to line 16 and has an output 66 connected to the input of a set point 46. Transducer 64 may be of the strain gage type, such as manufactured by Statham Instruments, Inc., 12501 West Olympic Boulevard, Los Angeles, California.

Output 66 is also connected to an input of a limit controller 68. Controller 68 has an upper limit set potentiometer 70 and a lower limit set potentiometer 72. Controller 68 has an upper limit output 74 and a lower output limit 76 connected to a tap changing controller 78 through switches 80 and 82, respectively. Controller 78 has an output 84 to a tap changer motor 86 and a cam drive motor 88. Cam drive motor 88 drives cams 90 and 92 by a shaft 94. Cam 90 actuates switch 80 through a cam follower 96 and cam 92 actuates switch 82 through a cam follower 98. A power transformer 100 has its primary winding 102 connected to a source of alternating current power through terminals 104 through an adjustable terminal tap reactance 106 which is adjusted by tap changer motor 86. A secondary winding 108 of transformer 98 is connected to converter 26 to supply power through cable 14 to torch 4.

To operate the control system, the ionizing gas is first selected which depends on the torch characteristics desired. As shown, there are three available gases, A, B and C, each with a different current-flow rate characteristic as shown in function generator blocks 30A, 30B and 30C. Any number of gases may be used in combination, or an individual gas may be used. Typically the gas used has a gas flow-arc current characteristic with a negative slope and large changes in arc current result from change in gas flow so that a good control system is required for stable operation. Valves 60A, 60B and 60C are set for the desired gas or gas mixture and switches 32A, 32B and 32C are set so that the corresponding function generators are connected to output 34. Potentiometer 38 is set to provide a signal representative of the desired torch current. The desired upper limit of gas flow is set on potentiometer 70 and the desired lower limit of gas flow is set on potentiometer 72.

When power is applied to the torch, converter 26 provides a signal 28 which is proportional to actual arc current. Function generator 30 provides an output 34 which is an inverse current characteristic of signal 28 for the particular gas or gas combination used. Signal 34 is compared with the output of potentiometer 38 to provide a torch current error signal 40 to controller 42.

Controller 42 provides a signal 44 proportional to the desired gas flow to set point 46. Pressure transducer 64 supplies signal 66 proportional to the actual gas flow and set point 46 compares signals 44 and 66 to provide a gas flow error signal 48 to controller 50. Controller 50 provides a signal 52 causing valve actuator 54 to set valve 56 to obtain the desired gas flow rate. This control system maintains the overall loop gain relatively constant in the presence of disturbances or different gases by the selection and use of the appropriate function generator 30.

If the arc length is shortened by a shifting of the material in the furnace, the current tends to rise rapidly thereby increasing the gas flow which may exceed the system design. There is also a lower limit of gas flow that must be maintained to keep the torch from overheating. Another control function must be provided to maintain the gas flow within the desired limits. This control may be provided by changing the electrode voltage.

The total electrode voltage drop consists of the drop in the melt, the drop in the positive column, and the drop across the gas being supplied to the torch. For a fixed arc length, the positive column drop is fixed and the bath drop can be considered constant. Therefore, if it becomes necessary to control current by varying the electrode voltage, the change in voltage must occur across the gas. This means that if an upper gas flow limit is reached, more reactance may be placed into the transformer primary circuit to reduce the electrode voltage and thereby reduce the torch current. The gas flow system will then reduce the gas flow to allow the current to establish itself at the set point value. If a lower gas flow limit is reached, the reactance must be decreased to provide a larger current and hence an increased gas flow to maintain the current at its set value.

In operation, the actual gas flow signal 66 is supplied to limit controller 68. When controller 68 senses that either a lower or upper limit has been reached according to the settings of potentiometer 70 and 72, controller 68 provides either an upper limit signal 74 or a lower limit signal 76 to tap change controller 78 through switches 80 and 82 which are assumed to be closed. Controller 78 provides a single pulse output 84 to tap changer motor 86 which steps reactor 106 the appropriate direction a single step. This changes the primary voltage of transformer 100 effecting a change in the voltage applied to torch 4.

Depending upon the dynamics of the gas flow control portion of the system, after the reactance has been changed, the output of the tap change controller must be removed for a period of time to allow the torch to assume a new operating condition so that the combination of the reactance and the gas flow can provide the required gas voltage drop. This is accomplished by output 84 of controller 78 providing a pulse to motor 88 causing it to rotate one revolution during the desired period of time and then stop. When motor 88 begins to rotate, cams 90 and 92 act on cam followers 96 and 98 to open switches 80 and 82, closing the switches again with the completion of the one revolution. Thereafter a further increase or decrease in tap changes can be made, but only one at a time and within the time period.

While the system described shows only a single phase system, the same control system can be applied to each phase of a three-phase system to provide for individual torch control.

I claim:

1. Apparatus for controlling torch current in a plasma arc torch comprising a supply of ionizing gas, a conduit connecting said gas supply to said torch, a valve in said conduit, means for providing a first signal proportional to the torch current, a function generator connected to said first signal providing means for providing a second signal having an inverse torch current characteristic based on the ionizing gas used, means for providing a third signal representative of the desired torch current, means connected to said function generator and said means for providing said third signal for comparing said second signal to said third signal thereby providing a fourth signal representative of the torch current error, a pressure transducer connected to said conduit for providing a fifth signal proportional to the actual gas flow in said conduit between said valve and said torch, a first controller connected to said means for comparing said second and third signals for providing a sixth signal represenative of the desired gas flow, means connected to said pressure transducer and said first controller for comparing said fifth and sixth signals and providing a seventh signal representative of the gas flow error, a gas valve controller connected to said means for comparing said fifth and sixth signals for providing a valve actuator signal, and a valve actuator connected to said gas valve and said gas valve controller and responsive to said valve actuator signal for adjusting said valve.

2. Apparatus according to claim 1 which includes an alternating current power source, a power transformer having a primary winding connected to said power source and a secondary winding connected to said torch, a variable reactance connected in series with said primary winding, a limit controller connected to said pressure transducer for providing an upper limit gas flow signal when said fifth signal reaches an upper limit and a lower gas flow signal when said fifth signal reaches a lower limit, and means connected to said limit controller and responsive to an upper limit gas flow signal for increasing said variable reactance a fixed increment and responsive to a lower limit gas flow signal for decreasing said variable reactance a fixed increment.

3. Apparatus according to claim 2 which includes means responsive to the occurrence of a signal from said limit controller for disconnecting said limit controller from said reactance changing means for a predetermined time interval.

4. Apparatus according to claim 1 which includes a plurality of gas supplies each of a different ionizing gas, a gas supply manifold connected to said conduit, a gas line connecting each gas supply to said manifold, a valve in each gas supply line, a plurality of function generators connected in parallel and connected to said first signal providing means, each generator being associated with a particular gas supply and providing a portion of said second signal based on the use of the particular ionizing gas, and switch means connected to said plurality function generators for supplying said second signal in accordance with the ionizing gas combination being used.

* * * * *